United States Patent [19]
Ricketts et al.

[11] Patent Number: 5,368,522
[45] Date of Patent: Nov. 29, 1994

[54] FEEDER-ROTOR ASSEMBLY FOR COMBINES

[75] Inventors: Jonathon E. Ricketts, Viola; Herb M. Farley, Plainfield; William L. Cooksey, Romeoville, all of Ill.

[73] Assignee: Case Corporation, Racine, Wis.

[21] Appl. No.: 47,705

[22] Filed: Apr. 14, 1993

[51] Int. Cl.$^5$ .............................................. A01F 12/10
[52] U.S. Cl. ........................................ 460/16; 460/70; 460/105
[58] Field of Search ................ 460/16, 20, 70, 73, 460/105, 113, 66; 56/14.6

[56] References Cited

U.S. PATENT DOCUMENTS

| | | | |
|---|---|---|---|
| 3,576,188 | 4/1971 | Tanis | 460/106 |
| 3,643,666 | 2/1972 | Denison | 460/106 |
| 3,648,709 | 3/1972 | DeCoene | 460/106 |
| 3,779,251 | 12/1973 | Rowland-Hill et al. | 460/106 |
| 3,827,443 | 8/1974 | Drayer | 460/16 |
| 3,982,549 | 9/1976 | DePauw et al. | 460/67 |
| 4,170,235 | 10/1979 | Ashton et al. | 460/73 X |
| 4,209,024 | 6/1980 | Powell et al. | 460/70 |
| 4,254,780 | 3/1981 | Powell et al. | 460/66 |
| 4,266,560 | 5/1981 | Powell et al. | 460/68 |
| 4,343,137 | 8/1982 | Seymour | 460/3 |
| 4,440,179 | 4/1984 | Bassett et al. | 460/105 |
| 4,474,188 | 10/1984 | Kashino et al. | 460/13 |
| 4,505,279 | 3/1985 | Campbell et al. | 460/66 |
| 4,889,517 | 12/1989 | Strong et al. | 460/66 |
| 4,900,290 | 2/1990 | Tanis | 460/70 |
| 5,186,683 | 2/1993 | Farley et al. | 460/105 |

*Primary Examiner*—David J. Bagnell
*Attorney, Agent, or Firm*—Rudnick & Wolfe

[57] ABSTRACT

A rotary combine including a feeder mechanism and a rotor assembly having an impeller assembly arranged at a forward end of a rotor. The feeder mechanism includes a housing which is pivotally connected to the combine about a transverse axis. The feeder mechanism housing envelops a conveyor assembly used to impart linear movements to the crop materials as they are advanced toward the rotor assembly. Prior to their introduction to the rotor assembly, the linearly advancing crop materials are discharged from a rotary member. A salient feature of the present invention involves the communicative relationship established between the rearmost rotary member from which the crop materials are discharged and the foremost end of the impeller assembly. The longitudinal spacial relationship therebetween is such that the crop material flow is permitted to transmute from the linear flow imparted thereto as the materials moved toward the rotor assembly and a rotary or circulatory flow imparted thereto as the materials are introduced to the whirling blades of the impeller assembly.

8 Claims, 2 Drawing Sheets

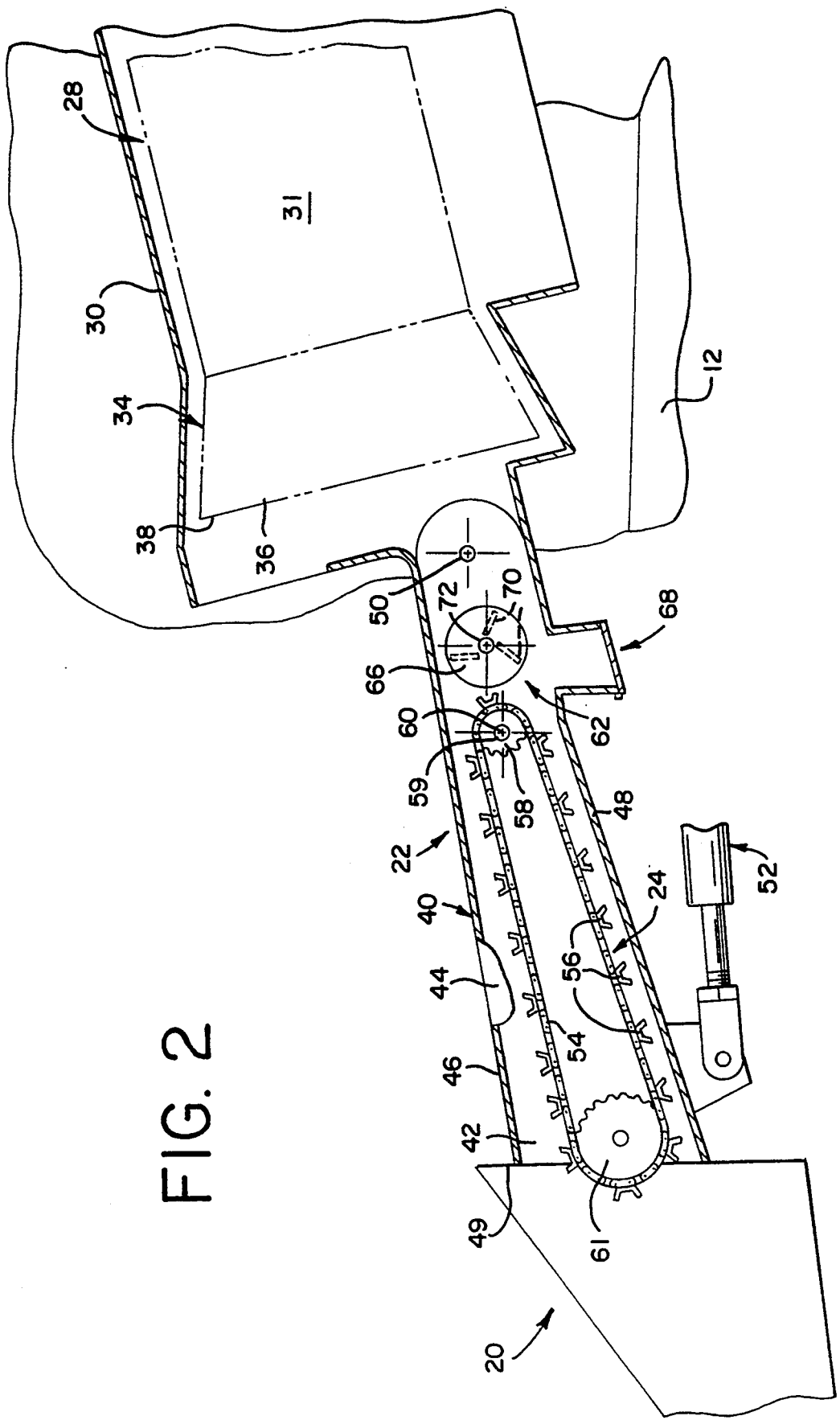

FEEDER-ROTOR ASSEMBLY FOR COMBINES

FIELD OF THE INVENTION

The present invention generally relates to rotary combines and, more particularly, to a feeder-rotor assembly which facilities introduction of crop materials into a forward end of a rotor assembly of a rotary combine.

BACKGROUND OF THE INVENTION

A common and well-known form of harvesting machine is a rotary combine. Rotary combines are available in various designs and models to perform the basic functions of harvesting, threshing, and cleaning of grain and other crop materials.

A typical combine includes a crop harvesting apparatus which reaps planted gain stalks as the harvester is driven across the field. The grain stalks or other crop materials harvested in the field are introduced to a feeder mechanism. A conventional feeder mechanism includes a housing with a material conveyor assembly arranged for movement therewithin. The housing of the feeder mechanism mounts the header assembly to a frame of the combine for vertical movement and has a width of about 35 inches to about 45 inches between opposite sides thereof. The conveyor assembly within the feeder mechanism rearwardly and linearly moves the crop materials along a bottom wall or floor of the housing in a layer or mat formation. At its rear end, the conveyor assembly of the feeder mechanism discharges the crop materials into an open ended rotor assembly in a conventional undershot manner.

In rotary combines the rotor assembly includes a generally tubular rotor casing mounted on the frame of the combine and a driven rotor disposed within the casing in co-axial relationship therewith. The rotor and casing have cooperating threshing instrumentalities arranged thereon for separating grain from material other than grain. In such a combine, which has been available for a number of years, the crop materials are threshed several times repeatedly, but gently, as they spiral around the rotor and allows grain to pass through openings in the rotor casing.

The ability to transfer crop materials from the feeder mechanism to the rotor assembly is a key factor in efficient and effective combine operations. Many rotors suited to rotary combines include an impeller blade assembly comprised of a series of impeller blades arranged at the forward end of the rotor. During a harvesting operation, these rotating impeller blades change the generally linear movement of the crop materials received from the feeder mechanism into whirling circulatory movement in a rearward and outward direction relative to the axis of rotation of the rotor. The outward circulatory movements allows spiral vanes on the interior surface of the rotor casing to thereafter engage and facilitate rearward crop material movements through the rotor assembly for threshing.

The linear distance separating the discharge end of the feeder mechanism from the foremost face of the whirling impeller blades represents a crop material transition area. Within this transition area, the movements of crop materials must convert or change from generally linear movements to generally circulatory movements. As will be appreciated by those skilled in the art, and depending upon the rotational direction of the rotor, those crop materials moving along and disposed generally to one side of the feeder mechanism housing will readily adapt to the change in direction of travel (linear v. circulatory) as compared to those crop materials moving along and disposed to an opposite side of the feeder mechanism housing.

The problems involved with changing the direction of the crop materials in the transition area extending between the feeder mechanism and rotor assembly are exacerbated when the rotary combine is used in long-stemmed leguminous or grassy crops, such as windowed perineal or annual rye grass, clover and bent grass. Such crop materials tend to have difficulty in transferring between a linear movement associated with the feeder mechanism and a circulatory movement associated with the rotary or circularly moving impeller blades.

Stones, rocks and other forms of hard objects are typically present in the fields over which the combine moves. As it will be appreciated, the introduction of stones, rocks and other hard objects into the rotor assembly of a combine can present serious problems and hinder operation of the combine. Of particular concern is the damage that such stones, rocks and other hard debris impart to the threshing cylinder and cooperating threshing instrumentalities of the rotor assembly.

Various devices have been heretofore used to inhibit the stones or rocks, passing into the rotor assembly of the combine. One such device includes a rock trap beater assembly which is conventionally mounted toward a discharge end of the feeder assembly. Those combines incorporating a rock trap beater assembly typically include a rock holding area disposed along the bottom wall of the feeder housing and into which the beater diverts rocks and stones prior to their introduction to the rotor assembly. The rock trap beater assembly includes a rotary member which extends transversely across the feeder housing and includes a plurality of transverse vanes or beaters which engage and trap the crop material against the floor of the feeder housing immediately prior to the introduction of the crop materials into the rotor assembly. Trapping the materials against the floor of the feeder housing immediately prior to the introduction of the crop materials into the rotor assembly, of course, tends to further complicate the transition for the crop materials moving between a linear movement and a circulatory movement.

Increasing the speeds of the conveyor assembly of the feeder mechanism to force the crop materials into the rotor assembly has not provided a solution to this common problem associated with rotary combines. Increasing the linear speed of the crop materials through the feeder mechanism has been found to further complicate combine operations by causing feedback problems as well as causing excessive power consumption thus detracting from the efficiency and effectiveness of the combine.

Thus, there is a need and a desire for a feeder-rotor assembly having a transition area which allows the crop material to change from a linear flow to a rotary or circular flow after release from the feeder mechanism and to seek the path of least resistance while under the influence of the rotor.

SUMMARY OF THE INVENTION

In view of the above, and in accordance with the present invention, there is provided a novel construction for a rotary combine including a feeder mechanism and a rotor assembly having an impeller assembly arranged at a forward end of a rotor. The feeder mechanism includes a housing which is pivotally connected to the combine about a transverse axis. The feeder mechanism housing envelops a conveyor assembly used to forcibly move and deliver crop material to the rotor assembly for subsequent threshing and further processing. The conveyor assembly of the feeder mechanism includes a rotary member toward a rear end thereof and which is arranged for rotation about a transverse axis. A salient feature of the present invention involves the communicative relationship established between the feeder mechanism and the foremost end of the impeller assembly in a manner allowing crop material flow to transmute from the linear flow imparted thereto by the feeder mechanism to a rotary or circulatory flow imparted thereto by the impeller mechanism.

To effect such advantageous ends, the rearmost rotary member of the conveyor assembly of the feeder mechanism is mounted separately from and forwardly of the transverse axis about which the feeder housing vertically pivots. The novel interrelationship between the rearmost rotary member of the feeder mechanism and the foremost end of the impeller assembly allows the crop dispersed from the feeder mechanism to seek the path of least resistance as it is introduced to the rotary impeller blades of the impeller assembly.

In a preferred form of the invention, a rock trap beater assembly including a rotary driven beater is mounted on the feeder housing for rotation about a transverse axis. The transverse axis of rotation of the rock trap beater is preferably arranged intermediate the discharge end of the conveyor assembly of the feeder mechanism and the foremost end of the impeller assembly. In those embodiments of the combine wherein a beater assembly is utilized, the transverse axis of the rock trap beater is mounted forwardly of the pivotal axis about which the feeder mechanism housing moves or pivots.

According to the present invention, the discharge end of the feeder mechanism is positioned in the range of about 5 inches to about 16 inches from the forward edge of the impeller assembly. In a most preferred form of the invention, the discharge end of the feeder mechanism is positioned about 7 inches from the foremost edge of the impeller assembly. For purposes of this application, the "discharge end of the feeder mechanism" is meant to include a point or location tangential to the rearmost edge of the rearmost rotary member from which the crop material is discharged. As will be appreciated, the rearmost rotary member of the feeder mechanism may constitute either a rearmost edge of a sprocket of the conveyor assembly or the rearmost edge of the blades or blade of the rock trap beater.

As will be described in further detail hereinafter, the novel interrelationship between the feeder mechanism and the rotor assembly allows movements of the crop materials to transmute smoothly from the linear movement or motion imparted thereto by the feeder mechanism to a rotary or circulatory motion imparted thereto by the impeller assembly or the rotor assembly. Rather than requiring a sudden shift or change in crop materials direction in the transition area, the unique positioning of the feeder mechanism relative to the rotor assembly as taught by the present invention allows transition in the direction of movement of the crop materials to be distributed over a greater distance thereby reducing the amount of energy used to introduce the materials into the rotor assembly and reducing the problems associated with feedback on the conveyor assembly. Positioning the discharge end of the feeder mechanism forwardly of the transverse axis of pivotal movement of the feeder housing allows the crop materials released from the feeder mechanism to seek the path of least resistance while under the influence of the impeller blades of the rotor assembly thereby facilitating their change in direction and motion.

Numerous other features and advantages of the present invention will become readily apparent from the following detailed description, the accompanying drawings, and the appendant claims.

BRIEF DESCRIPTION OF THE DRAWINGS

FIG. 2 is a simplified schematic illustration of the present invention.

DETAILED DESCRIPTION OF THE PRESENT INVENTION

Figure 1:
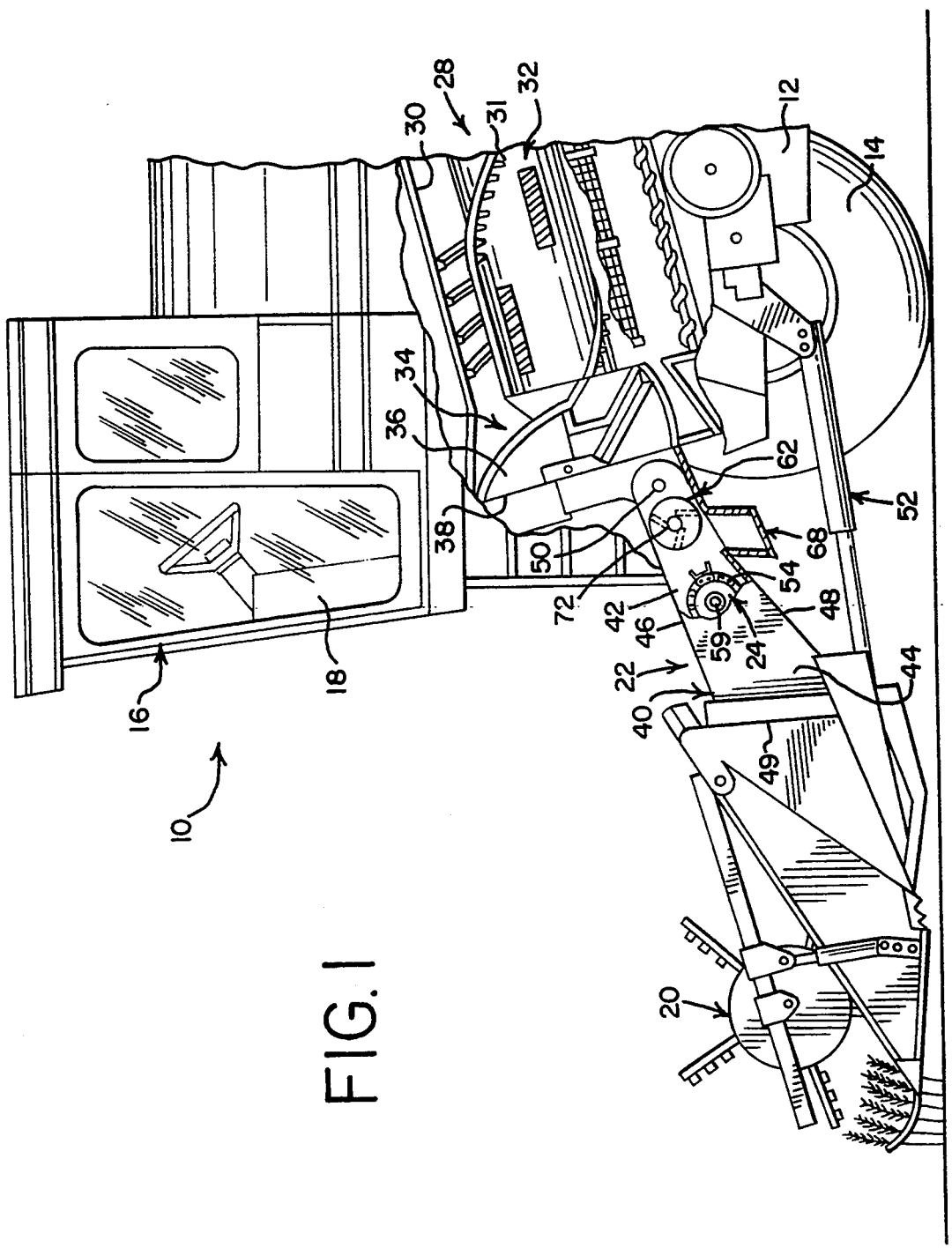
FIG. 1 is a side elevational view, partly in section of axial-flow-type combine with a major potion of one side wall being broken away to reveal features of the present invention.

While the present invention is susceptible of embodiment in various forms, there is shown in the drawings, and will hereinafter be described, a preferred embodiment of the invention with the understanding that the present disclosure is to be considered as an exemplification of the invention which is not intended to limit the invention to the specific embodiment illustrated.

Referring now to the drawings, wherein like reference numerals indicate like parts in the two views, there is shown in FIG. 1 a self-propelled rotary combine 10 which includes a fore-and-aft extending frame 12 supported by a plurality of wheels 14, only one of which is shown. An operator station is mounted on a forward portion of the frame 12 above the front wheels 14. The operator station 16 includes an enclosed cab 18 to protect the operator from the elements.

The combine 10 is operatively powered by an engine (not shown) suitably supported on the frame 12 and which provides driving power for the combine. The transfer of rotation and power from the engine to various driven components of the combine is of a conventional nature and could include fixed or variable belt or chain drives which are not shown or described but are well known in the art.

At its front or forward end, the combine is provided with a crop harvesting apparatus or header 20 for severing and gathering crop materials and which can be of any suitable design. The crop harvester apparatus 20 cuts and directs crop materials toward a crop feeder mechanism 22 including a conveyor assembly 24 preferably comprised of a conventional chain and slat conveyor. The conveyor assembly 24 linearly and rearwardly moves corp materials in a crop layer or mat toward a rotor assembly 28 which acts to separate and thresh grain from materials other than grain.

The rotor assembly 28 is supported in a conventional manner on the frame 12 of the combine and embodies crop threshing and separating means in a single unit. More specifically, the rotor assembly 28 includes a generally tubular rotor casing or housing 30 mounted in a fore-and-aft direction on the frame of the combine and a generally cylindrical rotor 31 arranged in a generally coaxial relationship within the casing 30. The rotor 31 has a plurality of threshing instrumentalities 32 mounted circumferentially thereabout and longitudinally therealong.

At its forward end, rotor 31 includes an impeller blade assembly 34 for drawing air and crop materials into and through the rotor assembly 28. The impeller blade assembly 34 is comprised of a plurality of substantially identical impeller blades 36 which are secured to the rotor 31 and are equally spaced relative to each other. The impeller blade 36 of the impeller assembly 34 may take different shapes depending upon the particular manufacture and other criteria. Suffice it to say, each impeller blade 36 has a leading edge 38 which lies in a plane extending generally normal to rotational axis of the rotor 31. As will be appreciated, upon rotation of rotor 31, the impeller blade assembly 34 rotates therewith.

As shown in FIG. 2, the feeder mechanism 22 includes a housing 40 which envelops the conveyor assembly 24. More specifically, housing 40 includes a pair of side walls 42 and 44 which are rigidly joined to each other by top and bottom walls 46 and 48 respectively. The side walls 42 and 44 are transversely spaced apart a distance ranging between about 35 inches and about 45 inches depending upon the particular combine design. The feeder housing 40 is joined at a forward end 49 and opens to the crop harvesting apparatus 20. Toward a rear end, the feeder housing 40 is pivotally connected to the frame 12 of the combine about a pivot axis generally indicated by reference 50 in FIG. 2. The feeder housing 40 with the crop harvesting apparatus 20 affixed to the forward end thereof is vertically positionable about the axis 50 under the influence of driver 52 preferably comprising a linearly distendable piston/cylinder assembly selectively operable from the operator station 16.

The conveyor assembly 24 of the feeder mechanism 22 receives crop materials from the crop harvesting apparatus 20 at a forward end and discharges the crop materials at a different elevational level for additional processing. As shown in FIG. 2, the conveyor assembly 24 includes a plurality of transversely spaced and tensioned endless chains 54 having a series of laterally elongated slats or cross bars 56 which span the lateral distance between the chains 54. The slats 56 are connected in a conventional manner to the chains 54 so as to be driven thereby. As shown in FIG. 2, the endless chains 54 are entrained for orbital rotation about a pair of longitudinally spaced chain supports 58 and 61. In the illustrated embodiment, support 58 defines a rotary drive member including a plurality of laterally spaced sprockets secured along the length of a driven shaft 59 supported at opposite ends by the respective side walls of the feeder housing 40 and which defines an axis 60. Securing all the sprockets to a common drive shaft ensures that the chains 54 will be driven in unison relative to each other. Chain support 61 serves as an idler roller. During operation of the feeder mechanism 24, the slats 56 entrap crop materials in a crop layer or mat and rearwardly move the crop materials along the bottom wall 48 of the housing in a linear fashion toward the rotor assembly 28.

When the combine is operated in rocky soil, it is likely that the crop harvesting apparatus 20 will occasionally pick up rocks, stones, or the like which may be conveyed rearwardly with the crop materials toward the rotor assembly 28. As will be understood, rocks, stones and like can cause severe damage to the threshing instrumentalities 32 and/or the housing 30 of the rotor assembly 28. Accordingly, a stone trap assembly 62 is arranged between the discharge end of the conveyor assembly 24 of feeder mechanism 22 and the rotor assembly 28 to inhibit the introduction of foreign articles such as stones, rocks, or the like into the threshing area.

The stone trap assembly 62 includes a rotary driven beater 66 arranged in a cooperative relationship with a stone receiving trough 68. In the illustrated embodiment, the stone receiving through 68 is formed as an integral part of the feeder mechanism housing 40. Beater 66 includes a plurality of equally spaced radial blades or vanes 70. Both the beater 66 and trough 68 span the transverse distance or width between the opposed side walls 42 and 44 of feeder housing 40. The driven beater 66 is supported at opposite ends by the respective side walls of the feeder housing 40 and defines a rotational transverse axis 72 arranged forwardly of the axis 50 about which housing 40 pivots.

During operation of the combine, unthreshed crop materials are rearwardly advanced in a linear fashion between the conveyor assembly 24 and the bottom wall 48 of feeder housing 40. As the crop materials linearly move rearwardly, they are generally in the form of a cohesive sheet or mat. The crop materials are linearly discharged toward the rotor assembly 28 as the chains 54 orbitally move about the sprockets or chain support 58.

In a preferred form of the invention, a single feeder mechanism housing design will be utilized for combines regardless of whether they embody a rock trap beater assembly similar to that discussed above. In those combine embodiments wherein a rock trap beater such as 66 is not utilized, and although the trough 68 is formed as an integral past of feeder housing 40, the length of chains 54 may be adjusted to allow the rearmost rotary support 58 of the conveyor assembly 24 to be rearwardly moved to rotate about axis 72. The momentum imparted to the crop layer or mat by the conveyor assembly 24 is sufficient to propel the materials across and bridge the distance separating the front and rear edges of the trough 68.

In those embodiments of a combine wherein a rock trap beater assembly 62 is utilized, and addition to facilitating movement of the crop layer or mat toward the rotor assembly, if the crop layer or mat of unthreshed crop materials contains any foreign articles having a mass, such as stones, and rocks, the blades or vanes 70 of the beater 66 engage such foreign materials and forcibly drive them into the trough 68 thereby inhibiting their introduction into the rotor assembly.

While the above feeder arrangement has performed in a generally satisfactory manner, it has been noted that within heretofore known combine structures, the unthreshed material in large measure remains in the form of a cohesive sheet or mat and, thus, as it linearly enters the rotating blades 36 of the impeller assembly 34, it is not in the best possible distribution pattern in order to effectuate highly efficient threshing of such crop materials.

In accordance with the present invention, the spacial configuration of the transition area defined between the discharge end of the feeder mechanism 22 and the leading edge of the impeller blade assembly 34 is interrelated in the novel manner set forth below. According the present invention, the transverse axis of the rearmost rotary member of the feeder mechanism, whether it be the chain support member 58 or the beater 66, is longitudinally displaced upstream of the transverse pivotal axis 50 about which the header assembly 25 vertically moves.

It is been found that a transitional area having a distance between the discharge end of the feeder mechanism 22 and the leading edge of the impeller blade assembly 34 which ranges between about 5 inches and about 16 inches advantageously allows the crop materials to transmute from a linear flow imparted to the materials by the feeder mechanism 22 and a rotary or circulatory flow imparted to the materials by the impeller blades 36 of the impeller blade assembly 34. In a most preferred form of the invention, the transitional area has a spacing between the discharge end of the feeder mechanism and a leading edge of the impeller blade assembly 34 of about 7 inches. While this construction may seem relatively simple, it is to be noted that it is a unique arrangement and substantially different from that which has been tried before and has resulted in dramatic differences with respect to the efficiency of a threshing operation. Rather than trying to force the crop materials into the impeller blade assembly 34, the present invention allows the crop materials to have an enhanced curvilinear configuration of travel as they are discharged from the feeder mechanism 22 and introduced into the rotary impeller blade assembly 34.

From the foregoing, it will be observed and numerous modifications and variations can be effected without departing from the true spirit and scope of the novel concept of the present invention. It will be appreciated that the present invention is intended as an exemplification of the invention and is not intended to limit the invention to the specific embodiment illustrated. It is intended to cover by the appendant claims any and all such modifications as fall within the scope of the attached claims.

What is claimed is:

1. A feeder-rotor assembly for a rotary combine comprising a fore-and-aft extending mobile frame assembly, a header assembly connected to said frame assembly for reaping crop materials as the combine is driven across a crop field, a rotor assembly mounted on the frame assembly for receiving and processing crop materials and including a rotor mounted for rotation about an elongated axis and having an impeller blade assembly comprised of a plurality of substantially identical impeller blades secured to a forward end of said rotor for inducing rotary outward and rearward movements to the crop materials received by the rotor assembly, a feeder assembly for receiving crop materials from said header assembly and discharging said crop materials into said rotor assembly, said feeder assembly including a feeder housing having said header assembly attached to a forward end thereof and which is pivotally attached at a rear end to the frame assembly for vertical movement about a transverse axis spaced forward of a leading edge of said impeller assembly, said feeder mechanism further including a conveyor assembly for receiving and rearwardly advancing the crop materials in a linear fashion between said header assembly and said rotor assembly, said conveyor assembly including a pair of longitudinally spaced rotary members about which material engaging driving chains are entrained, and wherein the rearmost rotary member of said conveyor assembly is mounted for rotation about an axis spaced forwardly of the impeller blade assembly so that a longitudinal distance ranging between about 5 inches and 16 inches separates a rearmost edge of the conveyor assembly and a foremost edge of the impeller blade assembly to allow the direction of the crop materials movements discharged from the feeder assembly to transmute from the linear movements imparted thereto by the conveyor assembly to rotary movements imparted thereto by the impeller assembly of the rotor assembly thereby increasing efficiency and effectiveness of the combine.

2. An assembly as set forth in claim 1 wherein the conveyor assembly further includes a plurality of material engaging slats connected to and driven by the chains.

3. An assembly according to claim 1 wherein the longitudinal distance separating a rearmost edge of the conveyor assembly and the leading edge of the impeller blade assembly is about 7 inches.

4. A feeder-rotor assembly for a rotary combine comprising a fore-and-aft extending frame assembly, a header assembly connected to said frame assembly for reaping crop materials as the combine is driven across a crop field, a rotor assembly mounted on the frame assembly for receiving and processing crop materials, said rotor assembly including a rotor mounted for rotation about an axis and having an impeller assembly comprised of a plurality of substantially identical impeller blades fixed to a forward end thereof for imparting outward circulatory movements to the crop materials introduced to the impeller assembly, a feeder assembly including a feeder housing attached at a forward end to the header assembly and attached at a rearward end to said frame assembly about a transverse pivot axis, said feeder assembly further including a conveyor assembly enveloped by said housing for conveying crop materials in a linear fashion from said header assembly and discharging the crop materials into said rotor assembly, and a rock trap beater assembly including a rotary beater arranged between a discharge end of said conveyor assembly and the rotor assembly for engaging the crop materials as they linearly advance toward the rotor assembly, and wherein the rotary beater of said rock trap beater assembly is mounted for rotation about a transverse axis spaced forwardly of the transverse pivot axis of the feeder assembly housing such that the direction of crop material movements passing from the rotary beater assembly can transmute from liner movement imparted thereto by the conveyor assembly and rotary beater to generally circulatory movement imparted thereto by the impeller blade assembly of the rotor assembly thereby enhancing efficiency and effectiveness of the combine.

5. The assembly according to claim 4 wherein said conveyor assembly includes a pair of fore-and-aft spaced rotary members with crop engaging drive chains entrained thereabout.

6. The assembly according to claim 4 wherein said rotary beater cooperates with a floor on the feeder housing to introduce the crop materials to the rotor assembly in an undershot fashion.

7. The assembly according to claim 4 wherein a longitudinal distance ranging between about 5 inches and about 16 inches separates a rearmost edge of the rotary beater from a foremost edge of the impeller blade assembly.

8. The assembly according to claim 4 wherein a longitudinal distance of about 7 inches separates a rearmost edge of the rotary beater from a foremost edge of the impeller blade assembly.

* * * * *